US012593764B2

(12) United States Patent
Lam et al.

(10) Patent No.: US 12,593,764 B2
(45) Date of Patent: Apr. 7, 2026

(54) AUTOMATED GROWTH SYSTEM FOR FLOATING AQUATIC PLANTS AND METHOD

(71) Applicant: RUTGERS, THE STATE UNIVERSITY OF NEW JERSEY, New Brunswick, NJ (US)

(72) Inventors: Eric Lam, East Brunswick, NJ (US); Shawn D. Sorrels, Somerset, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

(21) Appl. No.: 18/777,899

(22) Filed: Jul. 19, 2024

(65) Prior Publication Data

US 2025/0024800 A1    Jan. 23, 2025

Related U.S. Application Data

(60) Provisional application No. 63/528,154, filed on Jul. 21, 2023.

(51) Int. Cl.

| | |
|---|---|
| *A01G 31/06* | (2006.01) |
| *A01G 27/00* | (2006.01) |
| *A01D 44/00* | (2006.01) |
| *A01G 31/02* | (2006.01) |

(52) U.S. Cl.
CPC ........... *A01G 31/06* (2013.01); *A01G 27/003* (2013.01); *A01G 27/008* (2013.01); *A01D 44/00* (2013.01); *A01G 31/065* (2025.01)

(58) Field of Classification Search
CPC .............................. A01G 31/06; A01G 31/065
See application file for complete search history.

(56) References Cited

U.S. PATENT DOCUMENTS

| | | |
|---|---|---|
| 4,169,050 A | 9/1979 | Serfling et al. |
| 5,096,577 A | 3/1992 | Ngo et al. |
| 5,137,625 A | 8/1992 | Wolverton |

(Continued)

OTHER PUBLICATIONS

NSW Government, Department of Primary Industries (New South Wales), "Ozone in recirculating aquaculture systems," accessed Aug. 7, 2024. URL: https://www.dpi.nsw.gov.au/fishing/aquaculture/publications/water-quality-management/ozone-in-recirculating-aquaculture-systems.

(Continued)

*Primary Examiner* — Joshua J Michener
*Assistant Examiner* — Henry Hooper Mudd
(74) *Attorney, Agent, or Firm* — Howson & Howson LLP

(57) ABSTRACT

A hydroponic system for cultivation and harvesting of floating aquatic plants is provided. The hydroponic system includes an arrangement of a plurality of vertically-stacked cultivation trays, each tray containing an amount of fluent media on which floating aquatic plants are able to grow. The hydroponic system also includes a media reservoir in which fluent media is contained and subject to treatment before being circulated to the cultivation trays and a harvesting reservoir for receiving aquatic plants grown in the cultivation trays and harvested from the same. The hydroponic system further includes an automated control system that manages media flow into and from the trays and aquatic plant harvesting from the trays. A method of cultivating and harvesting floating aquatic plants is also provided.

17 Claims, 3 Drawing Sheets

(56) References Cited

U.S. PATENT DOCUMENTS

| | | | | |
|---|---|---|---|---|
| 5,269,819 | A | 12/1993 | Porath | |
| 5,636,472 | A | 6/1997 | Spira et al. | |
| 2016/0113222 | A1 | 4/2016 | Hori et al. | |
| 2018/0213735 | A1* | 8/2018 | Vail | A01G 31/06 |
| 2020/0060108 | A1* | 2/2020 | Goldsmith | A01G 31/06 |
| 2020/0375127 | A1* | 12/2020 | Thoma | A01G 31/06 |
| 2022/0087120 | A1* | 3/2022 | Singer | A01G 31/00 |
| 2023/0026903 | A1* | 1/2023 | Kendall | A01G 31/06 |
| 2023/0081407 | A1 | 3/2023 | Biehler et al. | |
| 2023/0337608 | A1* | 10/2023 | Adams | A01G 31/02 |
| 2023/0380359 | A1* | 11/2023 | Vergeldt | A01G 31/02 |
| 2024/0172613 | A1* | 5/2024 | Smith | A01G 31/02 |
| 2024/0188518 | A1* | 6/2024 | Moskal | A01G 31/06 |
| 2024/0306569 | A1* | 9/2024 | Ingram-Tedd | A01G 31/04 |

OTHER PUBLICATIONS

Parra, Lorena et al., "Design and Deployment of Low-Cost Sensors for Monitoring the Water Quality and Fish Behavior in Aquaculture Tanks during the Feeding Process," Sensors, vol. 18, No. 3, 750, Mar. 2018, pp. 1-23.

Coughlan, Neil E. et al., "Flow Rate and Water Depth Alters Biomass Production and Phytoremediation Capacity of Lemna minor," Plants, vol. 11, No. 16, 2170, Aug. 2022, pp. 1-20.

Petersen, Finn et al., "Re-circulating indoor vertical farm: Technicalities of an automated duckweed biomass production system and protein feed product quality evaluation" Journal of Cleaner Production, vol. 380, 134894, Oct. 2022, pp. 1-11.

* cited by examiner

AUTOMATED GROWTH SYSTEM FOR FLOATING AQUATIC PLANTS AND METHOD

CROSS-REFERENCE TO RELATED APPLICATIONS

This application claims priority of U.S. Provisional Application No. 63/528,154 filed Jul. 21, 2023, the entire contents being incorporated herein by reference as though set forth in full.

FEDERALLY SPONSORED RESEARCH AND DEVELOPMENT

This invention was made with government support under grant number 0903675 awarded by U.S. National Science Foundation, grant number SC00188244 awarded by the U.S. Department of Energy, and grant number 834870 awarded by the U.S. Department of Agriculture and National Foundation for Food and Agriculture via the Hatch program. The government has certain rights in the invention.

FIELD OF INVENTION

The present invention relates to the field of hydroponics. More specifically, the present invention relates to a hydroponic growth system that is modular and scalable and that contains key elements to enable automation for the growth and maintenance of floating aquatic plants, as well as ensure consistent production thereof.

BACKGROUND OF THE INVENTION

Aquatic plants, such as duckweed, can provide a sustainable source of high-quality biofuel, pharmaceuticals, and nutrition. By way of example, and not by way of limitation, the cultivation of duckweed or like aquatic plants can be provided for purposes of bioproduct generation, such as the production of protein, starch, ethanol, butanol, triacylglycerol for biodiesel, chemical feedstocks such as succinate, and the like. These plants may also be utilized to generate feed for animals such as poultry, cows, pigs, fish, and the like from various sources of nutrient-rich effluents such as anaerobic digesters of farm wastes, dairy-related waste streams, municipal waste treatment effluents, and the like. Duckweed cultivation may be used for carbon dioxide capture by coupling plant growth with flue gas generation sources, cement production industries, and the like. In addition, the cultivation of duckweed can produce and deliver nutrient rich microgreens in urban communities with minimal carbon footprint and can be used to provide a source of fresh, nutritious vegetable for military and space exploration purposes with minimal labor and training for deployment. Of course, duckweed and other aquatic plants may be cultivated for other purposes as well in addition to these examples.

SUMMARY OF THE INVENTION

According to an aspect of the present invention, a hydroponic system for cultivation and harvesting of floating aquatic plants is provided. The hydroponic system includes an arrangement of a plurality of vertically-stacked growing trays, each tray containing an amount of fluent media on which floating aquatic plants are able to grow. The hydroponic system also includes a media reservoir in which fluent media is contained and subject to treatment before being circulated to the growing trays and a harvesting reservoir for receiving aquatic plants grown in the growing trays and harvested from the growing trays. The hydroponic system further including an automated control system that manages media flow into and from the growing trays and aquatic plant harvesting from the trays.

According to one contemplated embodiment, the automated control system is configured to maintain media within each tray at a substantially constant level defining a predetermined media line within each tray. This level of media is maintained during media exchange when exchanging media in the trays and during harvesting of the aquatic plants from the trays. The automated control system may include a sonar-based sensor associated with each tray for determining the level of media within the tray. In addition, each tray may include a harvesting tube extending from a side wall of the tray such that the predetermined media line extends through a midsection of an opening of the harvesting tube. A normally-closed valve is located in the side wall of the tray closing the opening of the harvesting tube, and the automated control system is configured to open the valve during a harvesting procedure.

According to another aspect of a contemplated embodiment, the hydroponic system includes an ozone generator and an ozone diffuser submerged within media in the media reservoir for sterilizing the media within the media reservoir with ozone. The automated control system may be configured to control ozone treatment of the media in the media reservoir such that the dissolved ozone concentration in the media in the media reservoir reaches between 0.1 ppm and 0.2 ppm for a minimum of ten minutes or about 0.05 ppm to about 0.5 ppm, or about 0.05 ppm to about 0.2 ppm for a period of 30 minutes to several hours to ensure proper disinfection of the media before the media is permitted to be circulated to the trays.

According to a further aspect of the present invention, a method of cultivating and harvesting floating aquatic plants is provided. The method includes providing a treated nutrient media from a media reservoir to at least one growing tray within a growing system including a vertically stacked arrangement of a plurality of growing trays in which floating aquatic plants are growing in the media in the trays. The method also includes harvesting aquatic plants from one or more of the growing trays and regulating input and output of media flow to and from each tray such that a constant media level within each tray is maintained. The regulating step includes measuring a level of media within each growing tray with sonic-based sensors.

BRIEF DESCRIPTION OF DRAWINGS

The features and advantages of the present invention should become apparent from the following description when taken in conjunction with the accompanying drawings, in which.

DETAILED DESCRIPTION OF THE INVENTION

Figure 1:
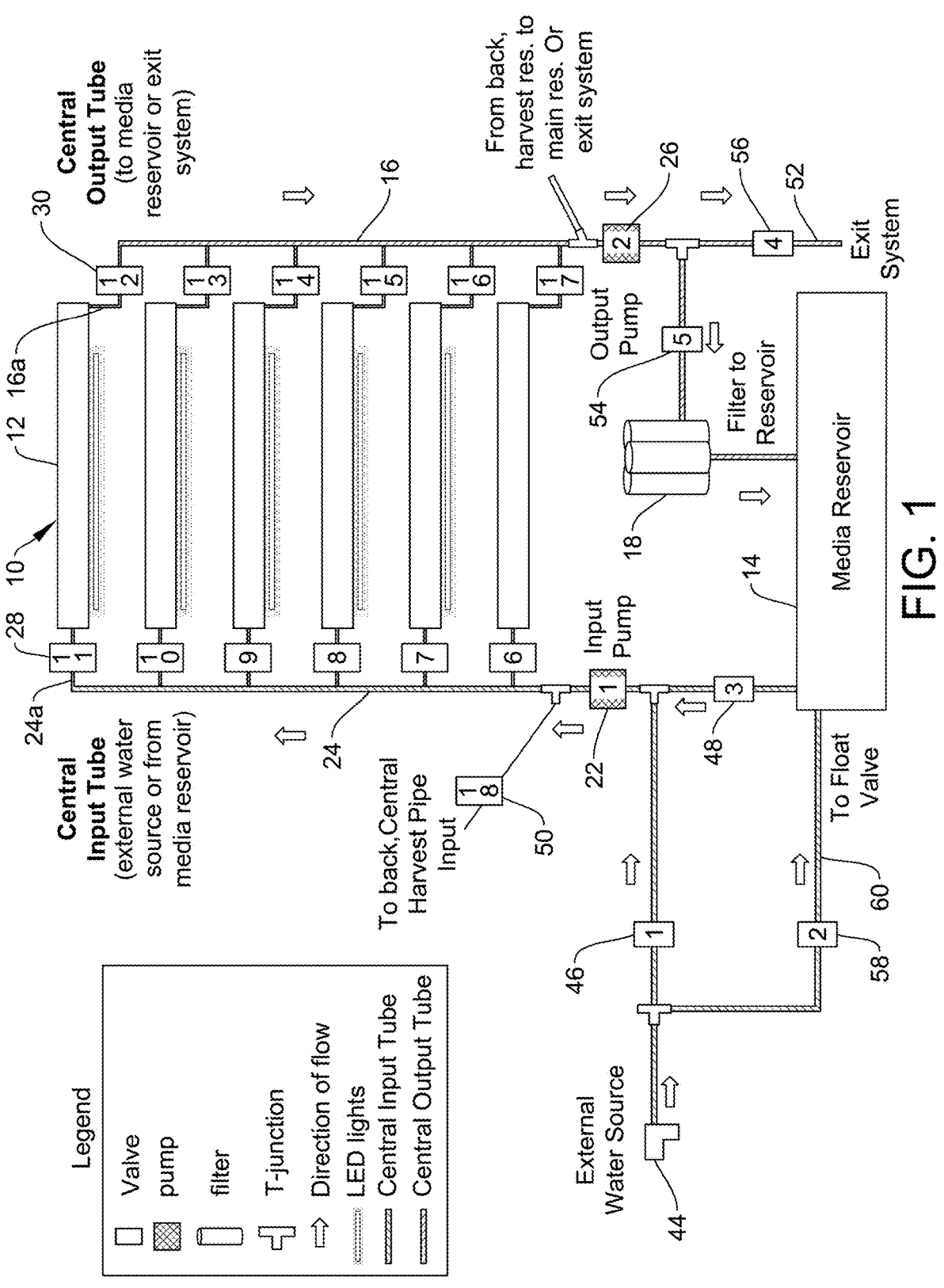
FIG. 1 is schematic view of a hydroponic growth module including automated media exchange/filtration according to an embodiment.

According to embodiments, apparatus, systems, and methods are provided for use in cultivating a commercially sustainable nutritious microgreen that can be grown locally and indoors at a high capacity and great efficiently requiring little, if any oversight. The apparatus for providing such systems is scalable to meet any particular demand. In addition, the embodiments can provide a climate resilient cropping system that can produce easily digested and nutritious vegetable continuously, anywhere by anyone, obviating the need for arable land. The cropping platform or system provides minimal waste at the levels of nutrient runoff, fresh water, and unused biomass, thus providing an environmentally superior farming system.

Accordingly, embodiments disclosed herein are directed to a modular and scalable hydroponic growing system for floating aquatic plants. The system may include a series of vertically stacked trays in which duckweed or like aquatic plants may be grown and from which the plants may be harvested at predetermined intervals or defined conditions. Each tray may be individually monitored, maintained, and controlled by computer-driven automation protocols via a series of pumps, valves, and assorted sensors. Each tray in the vertical stack is autonomous and controlled independently from other trays, allowing for maximum control of the growing environment through media conditioning, lighting, and harvesting.

Thus, the embodiments disclosed herein provide a technology platform that allows for hand-free, continuous plant production all year-round when growing a perennial plant that requires no re-seeding. Merely for purposes of providing an example, the system can be used for growing duckweed. A media reservoir for nutrient and water quality management may be connected to the growing system and the media within the system can be periodically pumped into the trays and tailored to the specific plant needs required in each individual tray. A sensor, such as an acoustic (sonar)-based sensor, can be used for automated management of the media level in each tray to enable reliable and economical management of liquid levels throughout the system. A common harvest reservoir for collection of plant biomass from each tray may be connected to the growing system with a means to return the "used" media to the media reservoir for treatment and reuse.

The system includes automated management protocols or procedures for media exchange/filtration, water exchange, and harvesting. These protocols enable the system to provide an autonomous biomass producer. Automated management of the procedures may be accomplished via wireless or WiFi-enabled control of components via a centralized software platform that schedules all aspects of protocol activation and de-activation, dosing, ozonation, and the like. Thus, the requirement for human labor may be minimized while maximizing biomass output and ensuring consistency of product quality. Nutrient/chemical dosing and periodic ozonation of media in the media reservoir work in concert with the above referenced protocols and are essential for ensuring reliable plant production with high quality biomass while minimizing microbial issues.

Thus, embodiments disclosed herein provide a modular and scalable hydroponic growth system with autonomous control, automated management techniques, and regular ozonation and nutrient/chemical dosing of media to ensure consistent plant production within the trays. Optimal lighting, ozone treatment levels, pH, and nutrient levels are provided and maintained, such as for a selected duckweed strain, so that a healthy growth environment with low levels of microbial or chemical contaminants may be maintained and long-term and continuous plant production is enabled.

Details concerning the systems and methods for media exchange, water exchange, and harvesting are provided below with reference to a contemplated embodiment shown schematically in FIGS. 1-3. Details of the apparatus including the vertically arranged trays, input/output valves, harvesting valves, various tubing, central input and output pipes or tubes, central harvesting pipe or tube, paths of flow throughout the apparatus, maintenance of media levels in the trays and the media reservoir, nutrient dosing of media in the media reservoir, ozone disinfection of the media in the media reservoir, and lighting are also discussed below.

Media Exchange

As discussed above, aquatic plants such as duckweed and the like are grown in a plurality of separate trays on the surface of a fluent or liquid media contained within the trays. The media in which the aquatic plants grow must be refreshed or exchanged on a periodic basis as needed to provide required nutrients for plant growth and to ensure an optimal growth environment is maintained within the trays.

According to embodiments disclosure herein, media exchange involves moving or circulating fluent media of the hydroponic system from a media reservoir to each tray and from each tray to the media reservoir. The media contained within the media reservoir is treated and then can be recirculated or returned to the trays. By way of example and not by way of limitation, apparatus (10) is shown in FIG. 1 having six separate trays (12) that are arranged in a closely-stacked vertical array with spacing between each pair of adjacent trays such that the bottom wall of an upper tray may be spaced in a vertical direction from a top rim of an adjacent lower tray. For instance, each tray (12) may have a depth of about 2.5 inches and the spacing between adjacent trays (12) may be about 0.5 inch to about 5 inches to provide relatively compact growing apparatus and increase of tray number per unit volume of space. In one contemplated example, the spacing may be 2.5 inches. Of course, other dimensions of depth, such as greater or less than 2.5 inches, and spacing, such as more than 2.5 inches or more than 5 inches, may be used. Also, the showing of six trays in the illustrated embodiment of FIG. 1 is by way of example only. The system (10) may include any number of trays, such as twenty trays or more, to maximize plant production within apparatus of a particular footprint area as desired.

As media contained within the trays (12) is moved, circulated, or flowed from each tray (12) to a media reservoir (14) via a central outlet tube (16), the media is passed through a filter (18). See FIG. 1. By way of example, the filter (18) may be a 3-stage filter in which the first stage of the filter is comprised of, but not limited to, a sediment block configured to remove particulates such as dust, algae, and other macro-scale particles. The second stage and third stage of the 3-stage filter may be comprised of activated charcoal and coconut carbon for removing organic chemicals and finer particulates from the media. Thus, the media being returned to the media reservoir (14) from the trays (12) is subject to filtering before entering the media reservoir (14).

After the media is returned to the media reservoir (14), the media is treated therein. For example, the media is subjected to nutrient and water quality parameter evaluation with sensors/probes (not shown) submerged in the media reservoir (14). Thereafter, adjustment of nutrient/quality (e.g., pH) levels is performed, for instance, by injecting an appropriate amount of liquid nutrients/chemicals into the media reservoir (14) based on the above referenced parameter evaluation. Thus, the desired nutrient content and quality of the media is restored to desired levels optimized for the particular plant and strain. In addition, the media within the media reservoir is subjected to ozonation treatment, for instance, by a diffuser (not shown) submerged in the media within the media reservoir (14) for microbial management. After the above treatments are completed, the media is ready for being pumped or circulated back to each tray via a media exchange procedure.

Figure 3:
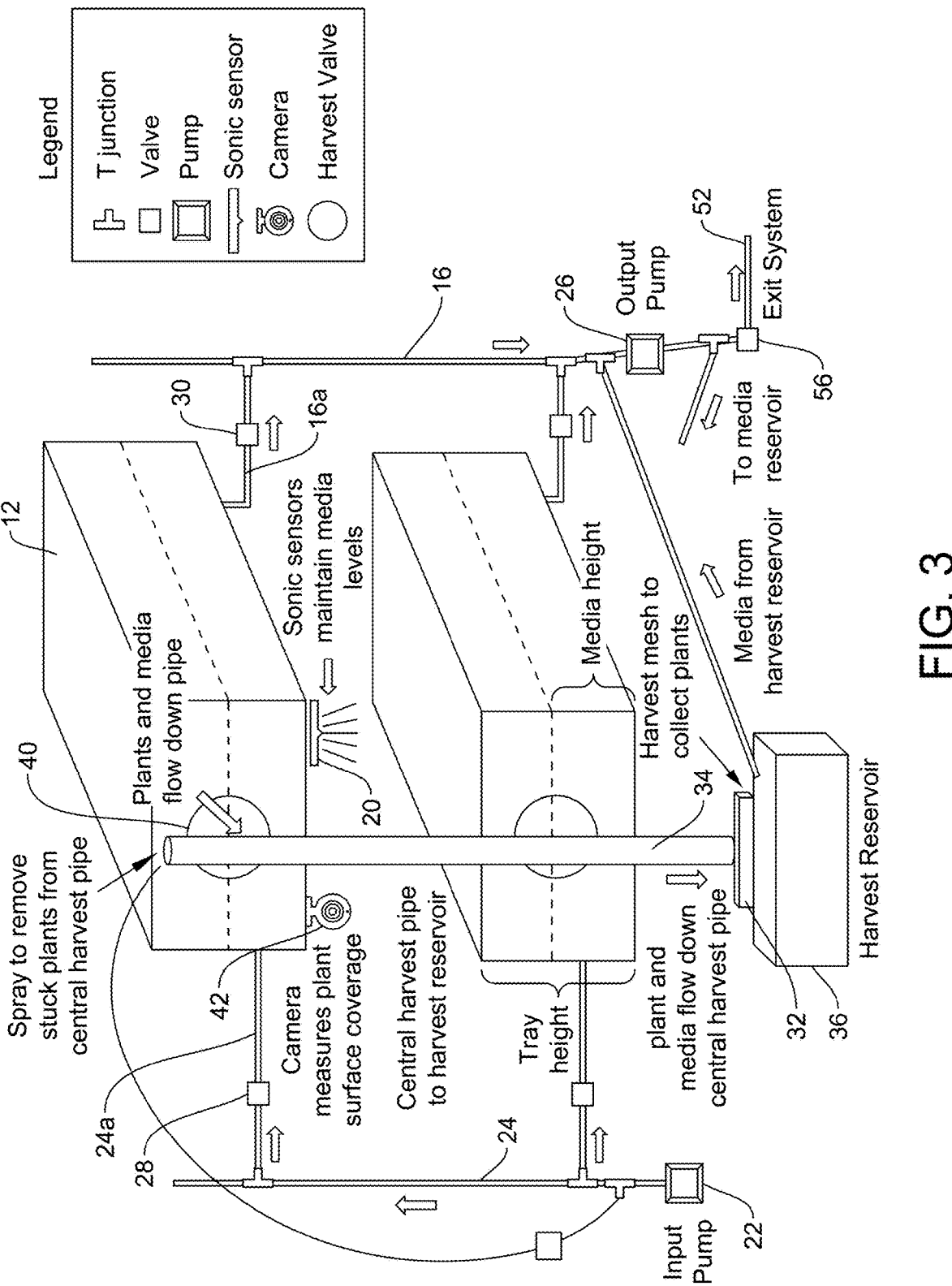
FIG. 3 is a schematic view of a hydroponic growth module including components for controlling media levels according to an embodiment.

Sensors, such as sonic sensors (for instance, see sensors (20) shown in FIG. 3), may be mounted above the upper surface of each tray (i.e., the sensors (20) may be mounted on an underside of an adjacent upper tray) for providing in situ media level monitoring for each tray. Sound waves are bounced off of the upper surface of the media within the tray and returned to the sensor to determine the distance between the sensor and the upper surface of the media in the tray which can be used to determine the level of the upper surface of the media within the tray. An example of a sensor is an ultrasonic sensor including a transmitter and receiver. Of course, other types of sensors may be utilized that provide other functionally-equivalent detectors for in situ media level monitoring.

By way of example, the system may be operated such that the media level in each tray is maintained within a 1 mm variance of a desired media level. A substantially constant media level is maintained during a media exchange procedure by controlling input and output flow rates of media into and from each tray. Here, media may be pumped by input pump (22) from the media reservoir (14) to any individual tray or all of the trays (12) via central input tube (24) while a substantially equal amount of media is pumped by output pump (26) from the trays (12) via central output tube (16). Each tray includes an input valve (28) and output valve (30), and the state of each input valve (28) and each output valve (30) of each tray controls the media flow into and out of each tray via a central programmable controller. Thus, flow into and out of each of the trays may occur sequentially or simultaneously.

Media exchange actions (i.e., nutrient dosing, ozonation, powering on or off of pumps, opening and closing of valves, causing flow of media to and from one or more trays, ceasing flow to one or more trays, etc.) may be controlled by customizable software automation such as over wireless communications, WiFi, or like communication technique from a centralized server or communications device. Media exchange can be programmed to occur on a timed schedule that best suits the particular species and strain of aquatic plants being grown or may be based on parameters other than time. By way of example and not be way of limitation, media exchange may occur for one or two hours each day, one or two hours each week, or follow any schedule as required. Thus, circulation of media is not continuous. Also, media exchange may be set to occur sequentially for a series of trays (i.e., one tray at a time) or may occur at the same time for a subset or all of the trays. All data concerning media exchange and schedules used therefor obtained from test and/or actual procedures and the like may be collected and fed into a database for future optimization via artificial intelligence (AI) technologies or the like.

Deployment of the sonar-based sensor system reliably regulates the media level in each of the trays. Such sensors are low maintenance and extremely accurate. Levels of media in a tray, container, reservoir or the like have conventionally been monitored via electrical conductivity strips that are immersed inside the media and thus tend to become degraded and/or contaminated with time of use. The sonar-based approach discussed above obviates this issue since it is based on sound waves and is physically separated from the media (i.e., located above the media as shown in FIG. 3). This use of sonar-based sensors provides a means of reliably measuring media levels in each tray while enabling automation of processes to perform various functions that involve controlling the level of the media.

Water Exchange

A protocol or procedure for flushing the trays (12) with fresh water may be required on a periodic basis. This water exchange procedure involves flushing each tray (12) with fresh water/media from an external source (44) via the central input tube (24) while simultaneously removing old or spent media from each tray (12) via the central output tube (16). See FIG. 1. The old media can be pumped back to the media reservoir (14) and subsequently diluted with fresh water during a media exchange cycle, or the old spent media can be removed from the system (10) to an external water reclamation system for centralized treatment and reuse. The media exchange protocol, discussed above, will take place immediately after a water exchange protocol to ensure that each tray (12) has adequate nutrient-optimized media after water exchange. The water exchange protocol ensures that media is generated (mixed) with fresh water in the media reservoir (14) and circulated through the system (10). All water exchange actions may be controlled by customizable software automation over wireless, WiFi, or like communication system from a centralized server or communication device. Water exchange can be programmed to occur on a timed schedule which best suits the particular species and strain of aquatic plants being grown. By way of example and not by way of limitation, this may be carried out approximately once a month depending on key indicators of the health of the system (10).

Harvesting

Figure 2:
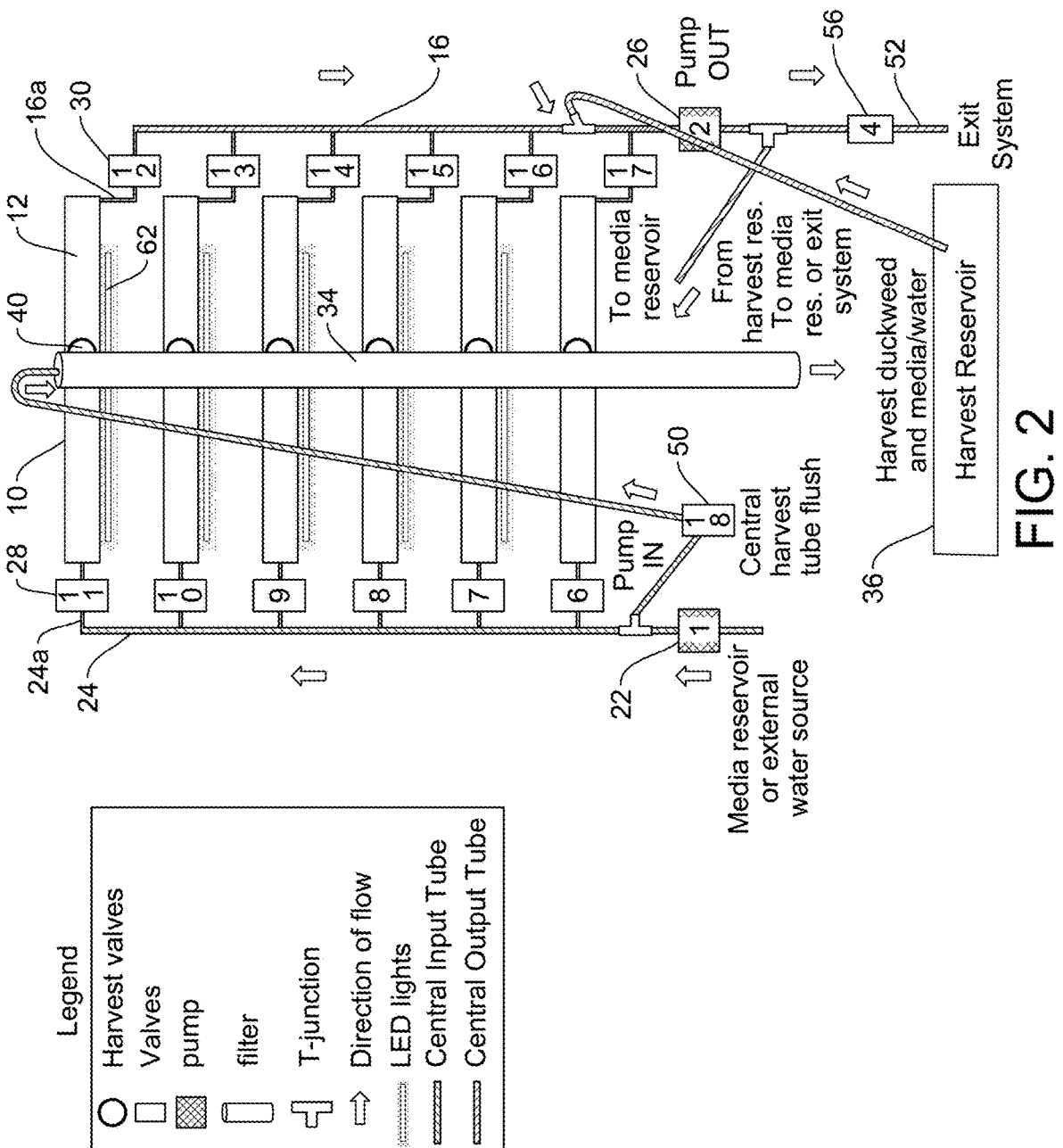
FIG. 2 is a schematic view of a hydroponic growth module including automated harvesting according to an embodiment.

As best shown in FIGS. 2 and 3, a harvesting protocol involves removing a portion of the growing plants from each tray (12) and collecting the grown plants in a mesh bowl-shaped collector or basket (32) that is situated below a central harvesting pipe (34) and resting on top of a harvest reservoir (36). As an example, one-inch diameter pipes or tubes may be connected to the harvesting side of a sidewall on each tray (12) and may feed into the central harvesting pipe (34) through a motorized valve (40). The valve (40) may be a ball valve, gate valve, or the like. The pipes are connected to each tray (12) such that the media level inside each tray rests at about a midpoint of the valve (40) or diameter of the pipe.

Cameras (42) are mounted above each tray (12) and feed images to a software program that determines if the plants fully cover the surface of the media. If true, the harvesting protocol may be automatically activated with a predetermined delay for the tray or other trays as well. As shown in FIG. 3, the cameras (42) may be mounted on the underside of an adjacent upper tray.

When harvesting of a tray is activated, the normally-closed valve (40) opens to permit media and plants to flow through the valve (40), then into and down the central harvesting pipe (34) to the collector (32). The media continues through the mesh collector (32) into the harvest reservoir (36), while the harvested plants remain in the collector (32).

As the media and plants exit the tray, the sonic sensor (20) for that tray signals the input/output pumps (22, 26) and/or valves (28, 30) to activate routines for maintaining a constant media level in the tray, thereby adding media from the media reservoir (14) to raise the level of media in the tray (12), or returning media from the tray (12) to the media reservoir (14) lowering the level of media in the tray (12), as dictated by the sonic sensor measurements. Thus, during a harvesting protocol, the media level within the tray (12) is maintained a constant height within the tray (12) due to the addition of media into the tray (12) at a rate that substantially matches the amount and rate of media passing into the central harvesting pipe (34).

The importance of maintaining a constant media level in each tray is to prevent the media level from rising significantly above its "normal" state, in turn preventing the plants from sticking to the side of the tray walls above the media line when the level returns to the normal lower level. If media level is permitted to rise periodically and plants become stuck to the sides of the tray walls above the media line, these plants will likely desiccate and die thereby resulting in a nutrient rich scaffold that algae and microbes can use to proliferate. Thus, for providing an optimal growth environment, it is important to prevent such unwanted dead tissues on the walls of the trays above the media.

After a pre-programmed time-span, or upon a signal sent from the camera (42) of the tray that indicates a sufficient amount of plants have been removed from the tray, the harvest valve (40) closes and media/plants cease exiting from the tray. Thereafter, ozonated media from the media reservoir (14) or water from the external source (44) is sprayed down the top of the central harvesting pipe (34) for purposes of removing and/or flushing of any stuck plants. In addition, the inner diameter walls of the central harvesting pipe (34) may be siliconized, e.g., with a synthetic hydrophobic surface-applied product such as a RainX brand of product or a like product, to minimize adhesion of solid matters. Media that exited the tray and is collected in the harvest reservoir (36) can be pumped to the media reservoir (14) post-harvest for treatment and reuse. Harvested duckweed or the like from each tray (12) collected in the mesh collector (32) is in a condition ready for post-harvest processing.

All harvesting actions may be controlled by customizable software automation over wireless, WiFi, or like communication system from a centralized server or communication device. Harvesting can be programmed to occur using robotic intelligence (camera software controlled) or on a predetermined timed schedule which best suits the plants and strains being cultivated.

Vertical Trays and Input/Output Valves

Each system (10) may include a series of two or more vertically stacked trays (12) of one foot or more in length by one foot or more in width, and with 2.0 inches or more in depth, such as 2.5 inches. Of course, the size of the trays (12) may be made larger or smaller than these dimensions, and any number of trays of any shape or volume could be provided. The system (10) is modular in that as many trays as desired, such as twenty, may be added as needed. The spacing between trays (12) may be maintained relatively small to provide a compact growing system. For example, the spacing may be about 0.5 inch or like height that permits cameras, sensors, lighting or the like to extend within the space. As a further example, the spacing may be within a range of 0.5 inch to 5 inches, or 0.5 inch to 2.5 inches, or may be greater than 2.5 inches or greater than 5 inches.

Each tray is connected to its own input tube (24a) of, for instance, 0.25 inch inside diameter or larger. The input tube (24a) may be connected to a side of the tray (12) which allows media or water to flow into the tray (12). Each tray also connects to its own output tube (16a) of, for instance, 0.25 inch inside diameter or larger connected to the bottom of each tray on or adjacent an opposite end from the inlet side, which allows liquid or media in the tray to exit. A mesh cover may cover the entrance of each output tube (16a) on the inside of each tray (12) to prevent plants from exiting the tray (12) during any of the protocol operations. Input and output flow from each tray (12) are dictated by which valves (28, 30) are opened or closed and whether the input or output pumps (22, 26) and/or valves (28, 30) are activated (i.e., powered on or off, valve opened or closed, etc.). Each input and output tube (24a, 16a) is equipped with one of the automated electronic valves (28, 30). Each input valve (28) connects the input tube (24a) from one tray (12) to the central input tube (24). Each output valve (30) connects the output tube (16a) from one tray to the central output tube (16). Thus, the central input tube (24) and the central output tube (16) may serve, connect to, and be shared by the entire array of stacked trays (12).

Accordingly, using a combination of valves, sensors, and pumps that are operated, controlled, and coordinated through the software platform of the centralized server or the like, automated media exchange, water exchange, and media treatment, in addition to plant harvesting, are accomplished in a fully automated manner requiring little manual labor, if any.

Central Input and Output Tubes and General Flow Explanation

The central input tube (24) connects all trays (12) to the media reservoir (14) and an external source of water (44). Input pump (22) controls the flow of media or water into each tray (12). A water source valve (46) controls input from the external water source (44) to each tray (12) through the central input tube (24) during a "water exchange" automation cycle. A media reservoir valve (48) controls input from the media reservoir (14) to each tray (12) through the central input tube (24) during a "media exchange" automation cycle. Thus, by appropriate control if the opening and closing of the water source valve (46) and media reservoir valve (48), either fresh water or media may be caused to be pumped or circulated to the trays (12).

A valve (50) connects the central input tube (24) to the top of the harvest pipe (34) and is used during a procedure of flushing any plants stuck within the harvesting pipe (34) into the harvest reservoir (36). Liquid from the external water source (44) or the media reservoir (14) can be used to flush the harvest pipe (34) dictated by which valves (46, 48) are opened or closed.

The central output tube (16) connects all trays (12) to the media reservoir (14) and to an external tube (52) that allows old and spent media to exit the growing system (down to drain or to an external water reclamation system). The output pump (26) controls the flow of liquid or media out of each tray (12) and out of the harvest reservoir (36). A valve (54) determines if the liquid or media from each tray (12) or the harvest reservoir (36) is directed to the media reservoir (14) and valve (56) determines if this liquid or media exits the growing system.

Maintenance of Media Reservoir Liquid Level

A valve (58) controls the flow of water from the external water source (44) into the media reservoir (14). According to one contemplated embodiment, the valve (58) is in a normally-open condition and allows the media reservoir (14) to maintain a consistent liquid level. External water to media reservoir tube (60) connects the external water source (44) (under pressure from an open tap or the outlet of a RO system) through the valve (58) to a float valve (not shown) inside the media reservoir (14). When media is pumped from the media reservoir (14) or evaporation lowers the media level, the external water source (44) and float valve maintains the media reservoir liquid level.

Nutrient Dosing and Ozone Disinfection in the Media Reservoir

Custom wireless or WiFi-enabled automatic dosing pumps (not shown) feed lines (not shown) into the media reservoir (14). Several nutrient solutions and other water quality mediating chemicals are pre-made, and dosing of appropriate quantities for these are controlled via sensor outputs. Various sensors (not shown) for pH, electrical conductivity, nutrients (e.g., nitrate, ammonia, etc.), may be housed inside the media reservoir (14). Media quality evaluation and remediation are performed between each of the media and water exchange cycles to ensure consistent quality and disinfection of the media before it is added back to each tray (12) or sprayed down the central harvest pipe (34) according to need. Thus, nutrient dosing and ozone disinfection are performed during times when there is no flow of media or water out of the reservoir (14) to the trays. These treatments ensure each tray has the optimal media for a defined plant growth application.

Ozone treatment may be performed by bubbled ozone into the media within the media reservoir (14), such as with a 5-micron stainless steel diffuser (not shown). Timing and duration of ozone treatment can be custom tailored for each plant growth application. By way of example and not by way of limitation, the dissolved ozone concentration in the media reservoir (14) may be set to reach between 0.1 ppm and 0.2 ppm for a minimum of ten minutes or about 0.05 ppm to 0.5 ppm, or about 0.05 ppm to 0.2 ppm, for a period of 30 minutes to several hours to ensure proper disinfection.

During ozone treatment, venting the off-gas from the media reservoir (14) can be accomplished, for instance, in at least one of the following ways. Fans may be used to create high airflow through the cultivation room/space accompanied with shutter-mounted exhaust fans to pull air from the enclosed space to the outside. Alternatively, the media reservoir (14) and all lines, tubes, etc., can be well sealed so that the ozone off-gas cannot escape the media reservoir (14). With this method, an air pump (not shown) with tubes/pipes leading from the media reservoir (14) to outside of the enclosed space are arranged so that when the ozone generator is producing ozone, the air pump can pull the ozonated off-gas to outside. It is important to remove the ozone off-gas from the enclosed space, not only for human safety, but also for the health of the plants growing in the system.

Use of periodic ozone treatment of the media provides an effective means to help suppress the growth of algae and other unwanted microorganisms in the system. While ozone is a known disinfectant for aqueous effluents from waste treatment and for cleaning vegetables, it is also known to severely impact the health and survival of plants. Thus, such treatment has not been effectively deployed in relation to plant production and has been avoided. However, in the embodiments disclosed herein, a range of concentration of ozone that can be applied without significantly impacting the growth of the plants while suppressing algal and other microbial growth is provided and utilized.

Dosing and ozonation systems may work in tandem with management protocols all controlled by customizable software automation over wireless, WiFi, or like communication technique from a centralized server or communication device.

Lighting

LED lighting (62) or the like is mounted on the growing system rack, above each tray (12) and/or side mounted vertically on the growing system (10). For instance, the lighting (62) may be mounted on the underside of an adjacent upper tray. The lighting (i.e., on, off, and/or intensity thereof) can be controlled via wireless or WiFi-regulated means or the like for individual trays. Alternatively, an onboard or local timer may be utilized.

While certain of the preferred embodiments of the present invention have been described and specifically exemplified above, it is not intended that the invention be limited to such embodiments. It will be apparent to one skilled in the art that various changes and modifications can be made therein without departing from the scope of the present invention, as set forth in the following claims.

We claim:

1. A hydroponic system for cultivation and harvesting of floating aquatic plants, comprising:

an arrangement of a plurality of vertically-stacked cultivation trays, each tray containing an amount of fluent media on which floating aquatic plants are able to grow;

a sonar-based sensor associated with each cultivation tray for determining a level of the fluent media within the cultivation tray by measuring a distance extending from the sonar-based sensor to a surface of the fluent media in the cultivation tray;

a media reservoir in which the fluent media is contained, subject to treatment, and re-circulated to each of the cultivation trays;

a harvesting reservoir for receiving aquatic plants grown in the cultivation trays and harvested from the cultivation trays; and an automated control system that manages flow of the fluent media into and from each of the cultivation trays and aquatic plant harvesting from the cultivation trays, the automated control system being configured to maintain the level of the fluent media within each cultivation tray at a substantially constant level defining predetermined media lines within the cultivation trays when exchanging the fluent media in the cultivation trays;

wherein each cultivation tray includes a harvesting tube extending from a side wall of the cultivation tray such that the predetermined media line extends through a midsection of an opening of the harvesting tube;

wherein each cultivation tray includes a normally-closed valve in the side wall of the cultivation tray that closes the opening of the harvesting tube;

wherein each cultivation tray is associated with a camera for taking images of the floating aquatic plants in the cultivation tray; and wherein the automated control system is configured to open the valve during a harvesting procedure initiated based on automated image recognition of at least one image of floating aquatic plants within at least one of the trays captured by the camera associated with one of the cultivation trays.

2. The hydroponic system according to claim 1, further comprising an ozone generator and an ozone diffuser submerged within the fluent media in the media reservoir for sterilizing the fluent media within the media reservoir.

3. The hydroponic system according to claim 2, wherein the automated control system is configured to control ozone treatment of the fluent media in the media reservoir such that the dissolved ozone concentration in the fluent media in the media reservoir reaches at least 0.1 ppm or 0.2 ppm for a minimum of ten minutes.

4. The hydroponic system according to claim 1, wherein the cultivation trays, media reservoir, harvesting reservoir, and an external water supply are interconnected with tubes or pipes and flow of the fluent media or a supply of water is controlled by pumps and valves, wherein the automated control system controls the operation of the pumps and valves to control flow of the fluent media and the supply of water through the hydroponic system based on automated management protocol schedules stored in a server and wireless communications with the pumps and valves.

5. The hydroponic system according to claim 4, wherein the management protocol schedules are configured to optimize growing conditions within each of the vertically stacked cultivation trays independently or in groups.

6. The hydroponic system according to claim 1, wherein each of the cultivation trays has an input tube that is connected to a central input tube that directs flow of the fluent media pumped from the media reservoir to each of the cultivation trays, wherein each cultivation tray has an output tube that is connected to a central output tube that directs flow of the fluent media pumped from the cultivation trays to the media reservoir, and wherein the automated control system regulates the flow of the fluent media during a media exchange procedure.

7. The hydroponic system according to claim 6, wherein the central input tube is configured to direct the flow of the fluent media to be pumped into each of the input tubes of each of the cultivation trays and into a central harvesting pipe, and wherein the central output tube is configured to direct the flow of the fluent media from each of the output tubes of each of the cultivation trays and the harvest reservoir and into the media reservoir or out of the hydroponic system.

8. The hydroponic system according to claim 7, further comprising a multi-stage filter such that the fluent media being pumped through the central output tube to the media reservoir passes through the multi-stage filter before entering the media reservoir.

9. The hydroponic system according to claim 1, wherein the media reservoir is integrated with an automated dosing system comprising:

sensors and probes for monitoring properties of the fluent media including pH, electroconductivity, nitrate, ammonium, phosphate, temperature, and ozone levels;

peristaltic pumps for adding nutrients or chemicals to the media reservoir; and an ozone generator, air pump, and submerged ozone diffuser to disinfect the fluent media.

10. The hydroponic system according to claim 9, wherein the automated dosing system is configured to measure nutrient and chemical parameters and to then perform treatment on the fluent media in the media reservoir for disinfection and maintenance of nutrient levels optimized for the aquatic plants in the cultivation trays.

11. The hydroponic system according to claim 1, further comprising pumps, valves, sensors, probes, ozone generation, and lights, and wherein all components of the hydroponic system including the pumps, valves, sensors, probes, ozone generation, and lights are controlled over wireless communications.

12. A method of cultivating and harvesting floating aquatic plants, comprising the steps of:

providing a treated nutrient media from a media reservoir to at least one cultivation tray within a growing system including a vertically stacked arrangement of a plurality of cultivation trays in which floating aquatic plants are growing on the media in the trays;

harvesting floating aquatic plants from one or more of the cultivation trays; and regulating input and output of media flow to and from each tray such that a media level within each tray is maintained constant during said providing step;

wherein said regulating step includes measuring the media level within each cultivation tray with a sonar-based sensor by measuring a distance of a surface of the media to the sensor;

wherein each tray includes a harvesting tube extending from a side wall of the tray such that the media level extends through a midsection of an opening of the harvesting tube;

wherein a normally-closed valve in the side wall of the tray closes the opening of the harvesting tube; and wherein an automated control system is configured to open the valve during a harvesting procedure initiated based on automated image recognition of at least one image of floating aquatic plants within at least one of the trays captured by a camera.

13. The method according to claim 12, wherein each cultivation tray has an individual input tube connected to an inlet side of the cultivation tray below the media level, wherein flow through each input tube is regulated by an electronic input valve that connects the individual input tube to a central input tube, wherein the central input tube is connected to the input tubes of the cultivation trays, the media reservoir, a central harvest pipe, and an external water source, wherein media and water flow through the central input tube is controlled by an input pump, and wherein operation of the input valves and input pump are controlled by the automated control system via wireless communications to the input valves and input pump.

14. The method according to claim 13, wherein each cultivation tray has an individual output tube connected to or adjacent the bottom side of the cultivation tray on an opposite side of the cultivation tray relative to the inlet side, wherein the flow through each output tube is regulated by an electronic output valve that connects the individual output tube to a central output tube, wherein the central output tube is connected to the output tubes of the cultivation trays, the media reservoir, a harvest reservoir, and a system exit tube, wherein media and water flow through the central output tube is controlled by an output pump, and wherein operation of the output valves and output pump are controlled by the automated control system.

15. The method according to claim 12, further comprising the step of treating the media in the media reservoir with ozone via an ozone diffuser submerged within the media in the media reservoir for disinfecting the media within the media reservoir, wherein the automated control system is configured to control ozone treatment of the media in the media reservoir such that the dissolved ozone concentration in the media in the media reservoir reaches at least 0.1 ppm or 0.2 ppm for a minimum of ten minutes.

16. The method according to claim 12, further comprising the step of treating the media in the media reservoir with ozone via an ozone diffuser submerged within the media in the media reservoir for disinfecting the media within the media reservoir, wherein the automated control system is configured to control ozone treatment of the media in the media reservoir such that the dissolved ozone concentration in the media in the media reservoir reaches 0.05 ppm to 0.5 ppm for a period of at least 30 minutes.

17. The hydroponic system according to claim 2, wherein the automated control system is configured to control ozone treatment of the fluent media in the media reservoir such that the dissolved ozone concentration in the fluent media in the media reservoir reaches 0.05 ppm to 0.5 ppm for a period of at least 30 minutes.

* * * * *